United States Patent [19]

Gerber

[11] 4,141,274

[45] Feb. 27, 1979

[54] WEATHER MODIFICATION AUTOMATIC CARTRIDGE DISPENSER

[75] Inventor: Robert L. Gerber, Ridgecrest, Calif.

[73] Assignee: The United States of America as represented by the Secretary of the Navy, Washington, D.C.

[21] Appl. No.: 842,448

[22] Filed: Oct. 14, 1977

[51] Int. Cl.² .............................................. B64D 1/04
[52] U.S. Cl. .................................... 89/1.5 R; 239/14; 244/136; 244/137 R
[58] Field of Search ............... 89/1.5 R, 1.5 A, 1.5 H; 239/14; 244/136, 137 R

[56] References Cited

U.S. PATENT DOCUMENTS

| 1,302,332 | 4/1919 | Du Pont | 124/29 |
| 3,430,533 | 3/1969 | Kifor et al. | 89/1.5 R |
| 3,628,416 | 12/1971 | Kernan | 89/1.5 R |
| 3,635,189 | 1/1972 | Whittemore | 116/114 |
| 3,698,317 | 10/1972 | Finch | 102/37.4 |
| 3,774,586 | 11/1973 | Saito | 124/29 |

Primary Examiner—Stephen C. Bentley
Attorney, Agent, or Firm—R. S. Sciascia; Roy Miller

[57] ABSTRACT

A weather modification cartridge dispenser for automatically igniting and dispensing pyrotechnic weather modification rounds wherein the dispenser is basically a motor driven automatic spring powered gun.

12 Claims, 6 Drawing Figures

WEATHER MODIFICATION AUTOMATIC CARTRIDGE DISPENSER

BACKGROUND OF THE INVENTION

1. Field of the Invention

The invention relates to a cartridge dispenser for automatically igniting and dispensing pyrotechnic weather modification round. The rounds are dispensed from an aircraft at rates up to one per second.

Ordinarily, pyrotechnic rounds are carried aboard an aircraft into or over a cloud formation and dispensed into the clouds to cause precipitation from the cloud.

2. Description of the Prior Art.

Previously, pyrotechnic rounds where dispensed from external racks aboard aircraft which carried 52 rounds. Alternate methods of dispensing pyrotechnics, are to fire individual pyrotechnic rounds from pistols or burn flares on supports attached externally of the aircraft. However, a current requirement is for the aircraft to be capable of dispensing 4,000 rounds from a single aircraft. There are no known prior art dispensors available which will handle the large number of required rounds.

SUMMARY OF THE INVENTION

The invention comprises a cartridge dispenser which automatically ignites and dispenses pyrotechnic weather modification rounds. The rounds are dispensed from an aircraft at rates up to one per second. The complete system consists of three main components. They are the dispenser, the magazine and the barrel complete with firing pin. Only the barrel is permanently secured to the aircraft. The dispenser mechanism is removably mounted to the aircraft and the magazines are loaded into the dispenser and depleted during flight.

DESCRIPTION OF THE PREFERRED EMBOIDMENT

Figure 1:
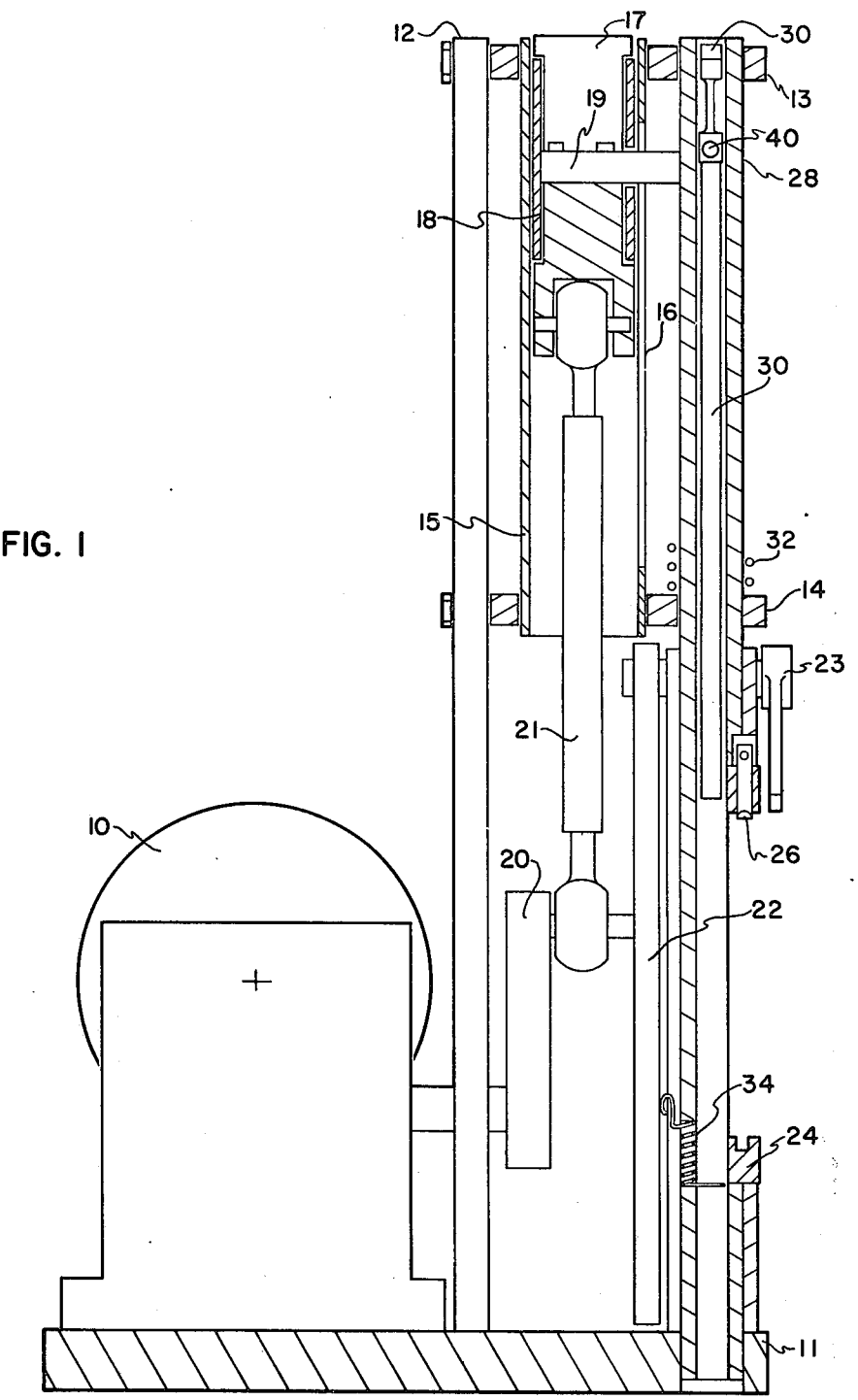
FIG. 1 is a side elevation, partly cut away of, the dispenser mechanism.

The dispenser is basically a motor driven automatic spring powered gun which is capable of firing rates of from 20 to 100 rounds per minute. With respect to FIG. 1, a motor 10 is secured to a base plate 11. The base plate 11 also supports a vertical support 12 which carries an upper support 13 and lower support 14.

Carried by the upper and lower supports 13 and 14 respectively is a cylinder like member 15 which is slotted as at 16. Carried within the cylinder 15 is a crosshead 17, nylon crosshead bushing 18 and a cocking arm 19.

Connected to the motor 10 is a crank 20 which in turn is connected to the crosshead 17 by means of a rod and bearing assembly 21. Also connected to the motor 10 is a magazine advance cam 22 which in turn is connected to a magazine advance dog 23 by means of suitable pins.

Also connected to the base plate 11, is a magazine track 24 and directly above the magazine track is a magazine detent 26 which holds a magazine in postion when the magazine is attached to the track.

Figure 2:
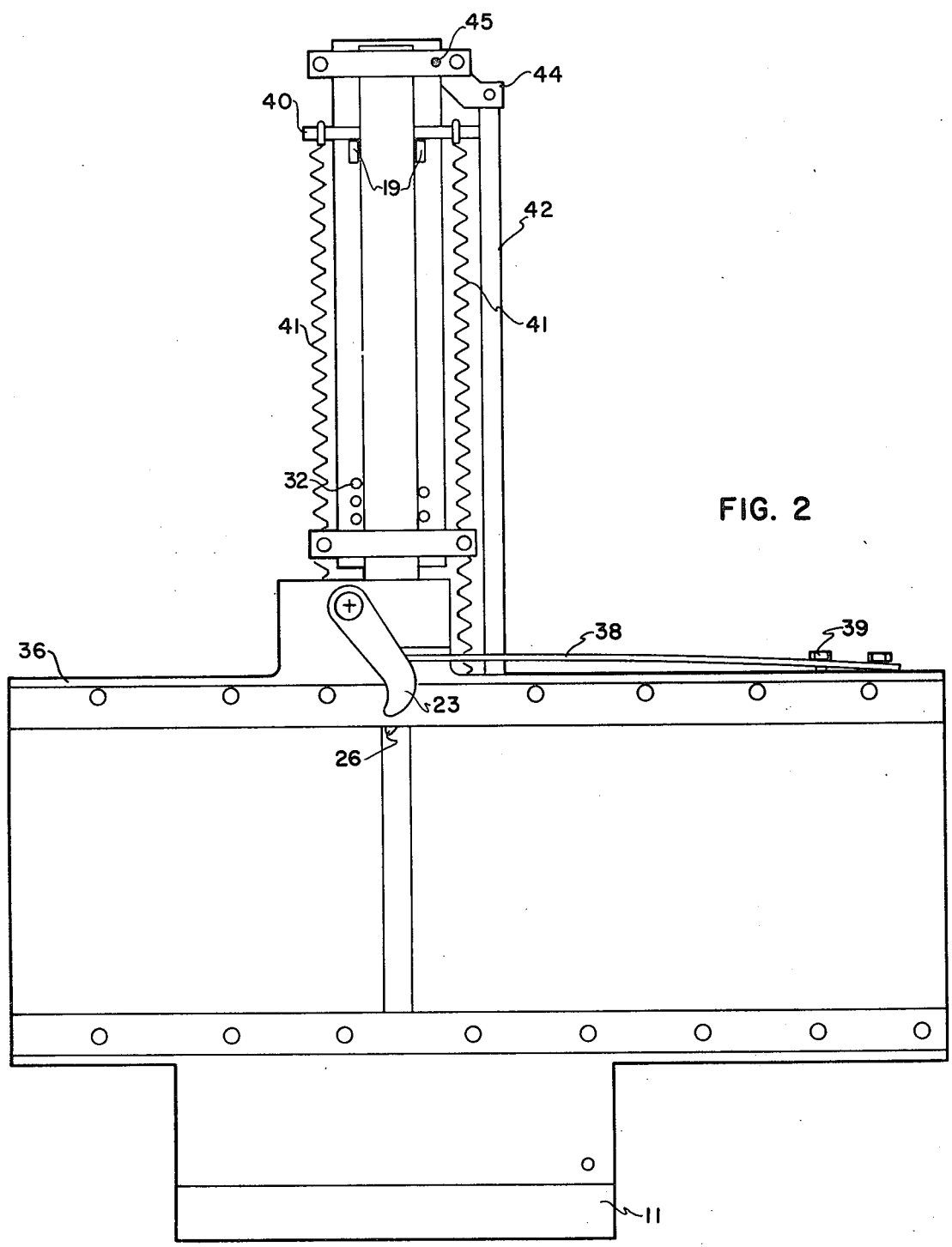
FIG. 2 is a front elevation of the dispenser.

Upper support 13 and lower support 14 also carry a barrel 28 in which a nylon ejector rod 30 recipicates. The ejector rod is notched at its upper end to cooperate with a sear 44 which is shown in FIG. 2. Surrounding barrel 28, is a shock absorber spring 32.

Also shown in FIG. 1, is a spring member 34 which terminates in a loop that projects into the ejection tube to prevent rounds from falling through the tube due to air pressure differential inside and outside the aircraft.

FIG. 2 shows more details of the dispenser wherein a magazine and barrel support 36 is shown attached to the base plate 11. Attached to the magazine and barrel support 36 is detent spring 38 and detent spring adjust 39.

As shown in FIG. 2, the cocking arm 19 bears on spring bar 40. The cocking arm 19 is connected to the crosshead 17. Also connected to the spring bar 40, are ejection springs 41. The ejection springs 41 are connected between the base plate 11 and the spring bar 40 to cause the ejector rod to move downwardly when the ejector rod is triggered.

Also shown in FIG. 2, is trip rod 42 which is connected at its upper end to sear 44 which in turn pivots about pivot 45.

Figure 3:
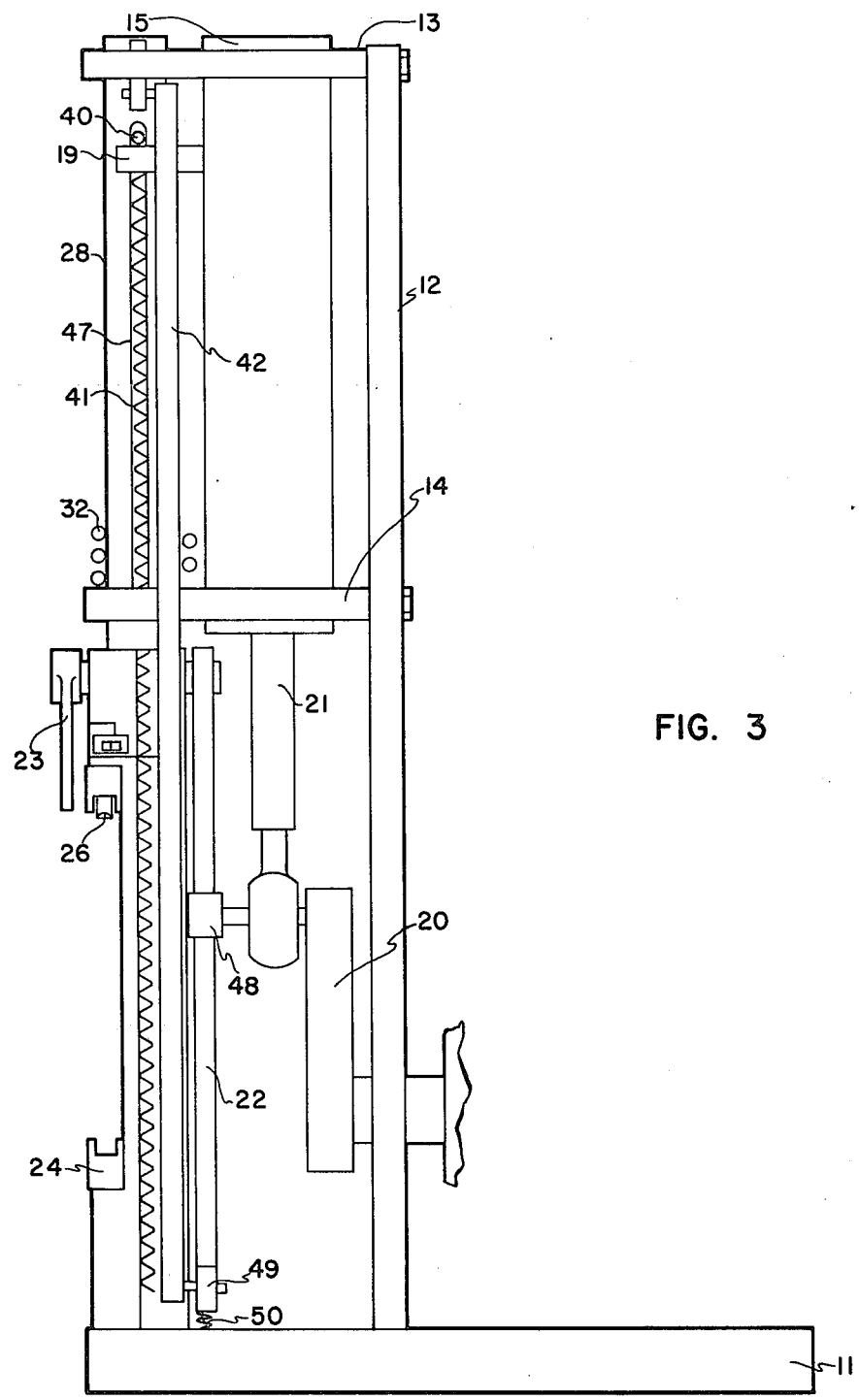
FIG. 3 is a side elevation opposite to FIG. 1.

FIG. 3 shows the remaining details of the dispenser wherein crosshead cylinder 15 is shown supported by the upper and lower support members 13 and 14 respectively. Also shown, is a slot 47 in the barrel 28 in which the spring bar 40 reciprocates.

Cam follower 48 rides on the magazine advance cam 22. Also connected to the magazine advance cam, is trigger 49 which in turn is connected to base plate 11 through trigger spring 50.

Figure 5:
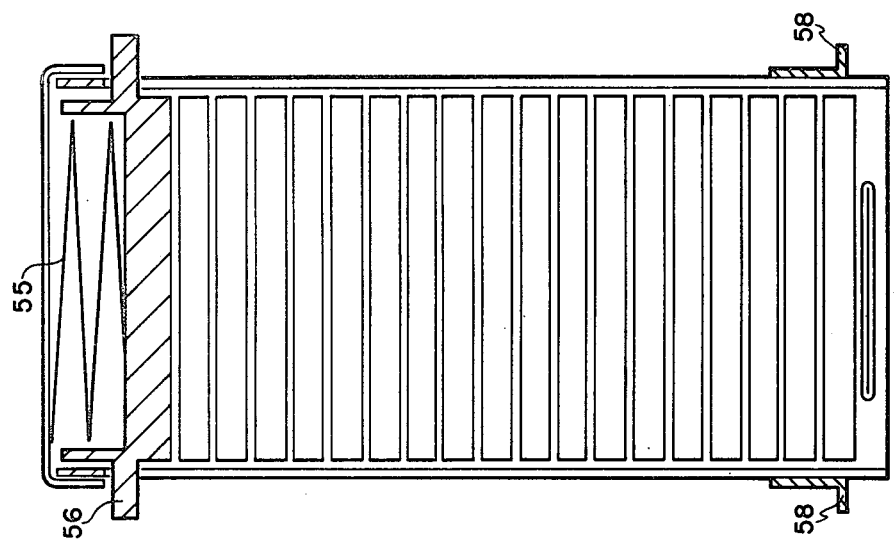
FIG. 5 is a cross section along 5—5 of FIG. 4.
Figure 4:
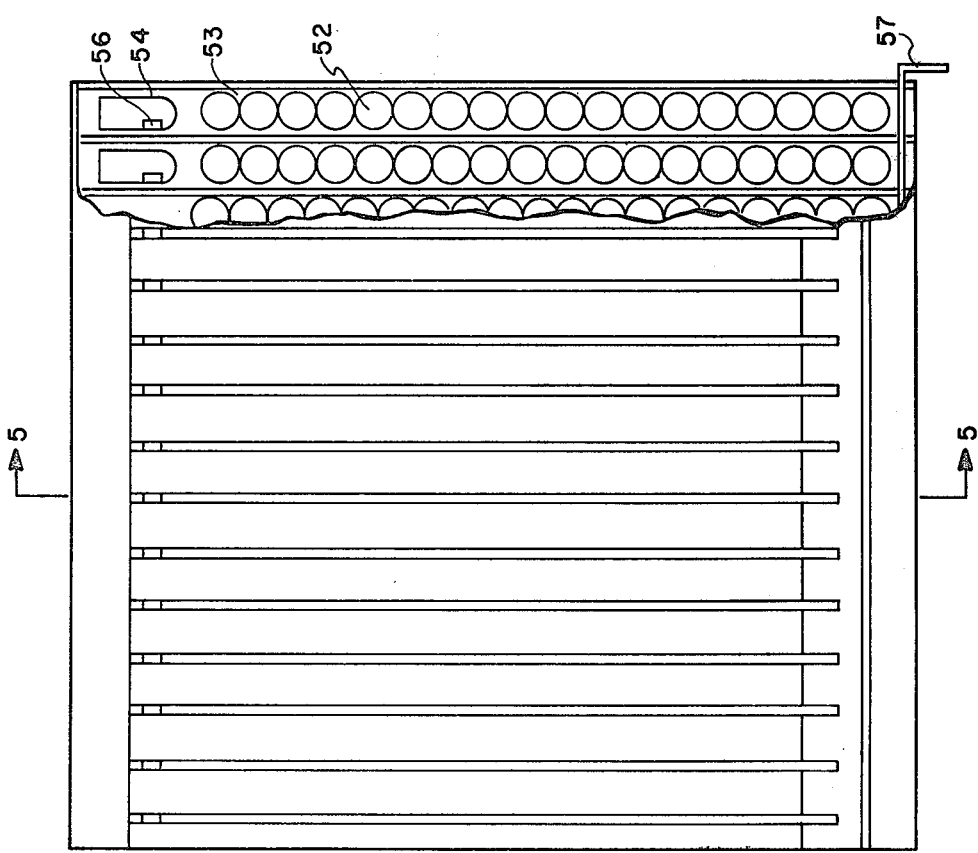
FIG. 4 is a plan view of a dispenser magazine partially cut away to show positioning of rounds therein.

FIGS. 4 and 5 illustrate details of the magazine adapted for use with the dispenser. FIG. 4 is 9 plan view of the magazine partly cut away to show rounds 52 in position in bins, one of which is indicated at 53. Each of the bins is adapted to hold 19 rounds, each round being 5 inches long and ½ inch in diameter. The individual rounds are fed sequentially into the barrel of the dispenser by means of a spring loaded pressure plate 54. The pressure plate is loaded by a spring 55 shown in FIG. 5. A magazine advance dog 56 forms a portion of the pressure plate 54.

Also shown in FIG. 4, is retainer 57 which covers the bins 53. The retainer 57 is adapted to engage the magazine and barrel support 36 at the right side thereof with respect to FIG. 2 when the magazine is loaded onto the dispenser.

The magazine is held in place on the magazine track 24 by means of guides 58, shown in FIG. 5.

Figure 6:
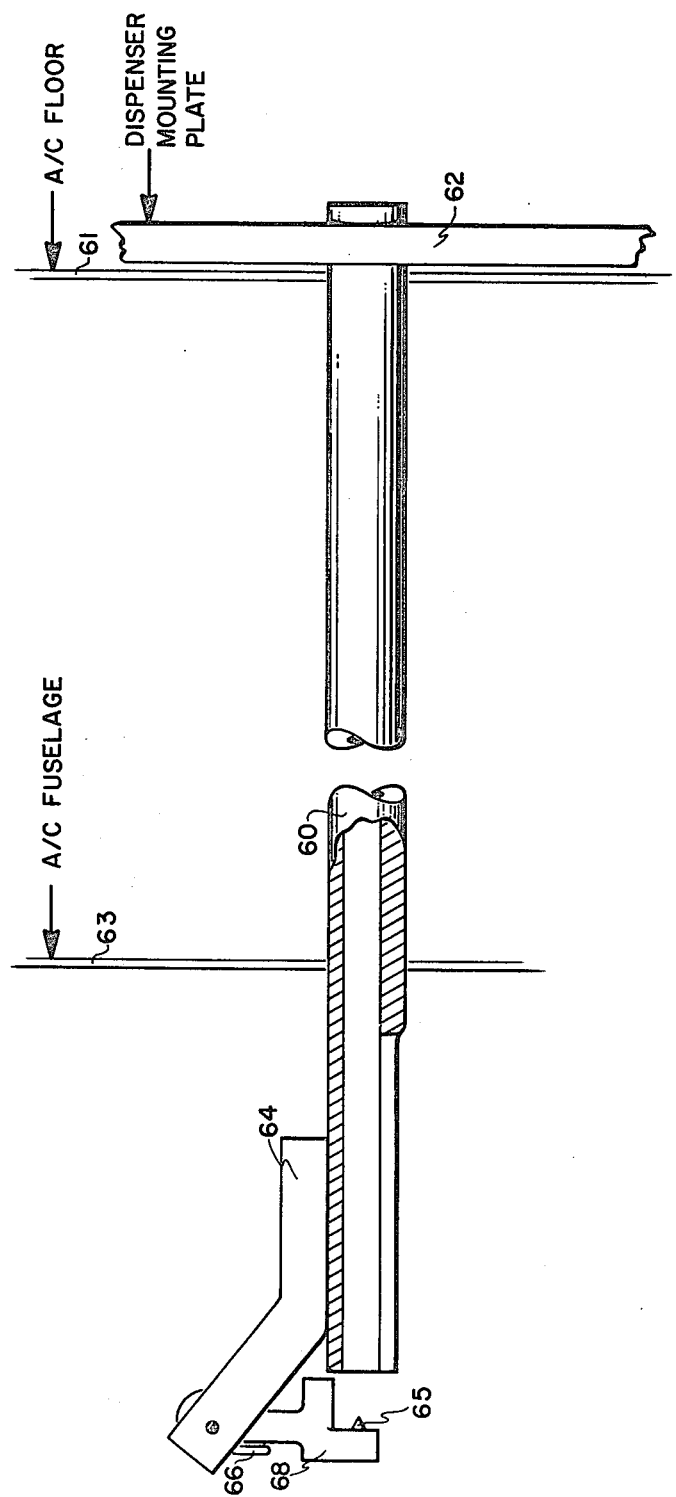
FIG. 6 is a plan view, partially cut away, of the dispenser barrel and firing pin mechanism.

The dispenser barrel and firing pin are shown in FIG. 6 wherein barrel 60 is mounted at one end to the aircraft floor 61 by means of a dispenser mounting plate 62. The other end of the barrel protrudes through the aircraft fuselage and has a link 64 adjacent that end which carries firing pin 65. Firing pin 65 is held in firing position by means of a resilient spring 66.

Operation.

Rotational motion of the motor output shaft from motor 10 is converted to translational motion in the crosshead 17. Cocking arm 19 attached to the crosshead acts on the spring bar 40 to elevate the ejector rod 30 to cocked position. The ejector rod 30 is elevated as the crank rotates from its lower to upper position (180° rotation). Elevation of the spring bar 40 results in loading of the ejection springs 41.

As the ejector rod is elevated to its upper most position, the sear 44 is forced into the retracted position by cam action between the ejector rod 30 and sear 44. The sear acts through the trip rod 42 to lower the trigger 49 which compresses the trigger spring 50.

When the ejector rod 30 nears it upper most travel, the trigger spring expands, elevating the trigger 49, which elevates the trip rod 42, which rotates the sear 44 about the pivot point 45 into the ejector rod detent. As the crank then rotates from its upper most to lower most position, the crosshead 17 and cocking arm 19 translate to their lowest position. The ejector rod 30 is maintained in the upper most position by the sear 44.

As the crank nears its lowest position, the cam follower 48 engages the trigger 49 thereby depressing it. Depressing the trigger removes the sear from the ejector rod detent through the action of the trip rod 42. As sear 44 clears the detent, the ejector rod 30 is accelarated downward by action of the ejection springs 41 through the spring bar 40.

As the ejector rod 30 nears its lowest position, the spring bar 40 contacts the shock absorber 30 which brings the spring bar and ejector rod to rest in the final 0.5 inch of travel. Further rotation of the crank releases the trigger 49, allowing the sear 44 to return to the detent position.

This completes the cocking and ejection cycle of the dispenser. This cycle is repeated with each rotation of the crank. Each time the ejector rod 30 is drawn up, a round is forced into the chamber below the ejector rod. The round is expelled at 30 to 50 feet per second by the falling ejector rod.

Also included in the dispenser, is a mechanism for automatically advancing the magazine. As the crank 20 rotates from its lower to its upper most position, the cam follower 48 contacts the magazine advance cam 22 causing it to rotate about its support shaft. The magazine advance cam 22 is connected to the magazine advance dog 23 through a shaft which is free to rotate. The magazine advance cam 22 is designed such that it rotates the advance dog at constant positive acceleration during the first half of its travel and constant negative acceleration during the second half. Thus, the advance dog 23 goes smoothly from rest to maximum rotational velocity at the midpoint then slows to a stop at its extreme travel. Dog 23 is returned to the starting position in a similar fashion by the cam 22. This cycle is repeated with each rotation (360°) of the crank 20.

The magazine consits of 16 spring loaded bins each contaig 19 rounds. The rounds are 5 inches long and ½ inch in diameter. The rounds are sequencially fed from each magazine bin, such as at 53, into the dispenser. When one bin is depleted, the magazine is automatically advanced to the next bin.

Each magazine bin, such as at 53, contains a spring 55 which acts upon the pressure plate 54 which in turn forces the rounds from the bin. The rounds are held in place within the bin by means of the moveable retainer 57 which closes the lower end of the magazine. Each pressure plate is equiped with a magazine advance dog 56.

The magazine is loaded by inverting it and depressing the pressure plate 54 by means of the advance dog 56. The bin is then filled with rounds and the retainer is engaged so that the filled bin is covered. This procedure is repeated until all bins are full. One precaution is that the round must be loaded in the magazine, primer end down. Correct loading may be verified by viewing the rounds through the advance dog slots after loading. The two ends of the rounds are made such that they are of different colors and one round in backwards will stand out. The advance dog slot in the side of each bin is placed to one side such that the primers are not exposed.

In operation, the magazine is slid into the dispenser track 24 until the first bin is over the dispenser breech. The retainer 57 is held by the magazine and barrel support 12 such that the bin over the breech is automatically uncovered. The magazine detent 26 holds the magazine in place.

When the dispenser ejector rod 30 is elevated, a round is forced from the magazine into the breech of the barrel 28. When the ejector rod is released, the round is expelled at 30 to 50 feet per second. This sequence is repeated until all 19 rounds are expended from a bin.

As the last round of a bin is chambered, the advance dog on the magazine falls in line with the advance dog on the dispenser. Rotation of the dispenser crank actuates the magazine advance cam 22 thereby rotating the dispenser advance dog 23 which advances the magazine to the next bin. This sequence is repeated until all rounds are expended from the magazine. The magazine is then removed and replaced by a full one.

Now with respect to FIG. 6, the barrel assembly guides the round from the dispenser through the external skin 63 of the aircraft and onto the firing pin 65. Ignition occurs as the round strikes the firing pin 65. The firing pin 65 is pivoted and spring loaded by spring 66 such that when struck by a round it rotates out of the way, allowing the round to pass. A foot 68 on the firing pin imparts a spin to the round about the transverse axis. The spin is required to stabilize the round in a tumbling mode while falling. This will insure a uniform decent rate for all rounds dispensed. The firing pin is returned to the ready position by return spring 66. The mass of the firing pin is adjusted to provide sufficient kinetic energy to fire the round primer.

The present system provides a means of dispensing a large number of pyrotechnic items from an aircraft. The expelling force is a spring thereby eliminating the need for an explosive expelling charge. Thus, there is no extraneous material left over after a round is expelled such as cartridge cases or link belts.

In addition, the barrel is not fouled by an expelling charge and no explosives or pyrotechnics are ignited inside the aircraft. Also, the magazines may be reloaded in the field without special equipment and elimination of a cartridge case and expelling charge greatly reduces the cost of the round.

The dispenser is applicable to other airborne requirements where numerous small items are to be dispensed, such as for instance, chaff rounds.

What is claimed is:

1. A cartridge dispenser comprising;
 a base member for supporting the dispenser;
 motive means mounted on the base member;
 support means secured to said base member;
 cylinder like means supported by said support means;
 piston like means slideably mounted in said cylinder like means and reciprocable therein;
 barrel means secured to said support means;
 cartridge ejector means slideably mounted within said barrel means and reciprocable therein;

cocking means carried by said piston-like member and engageable with a portion of said cartridge ejector means;

connecting rod means linking said motive means and said piston-like member;

said motive means being operable to move said cartridge ejector means to a cocked position; and trigger means operable to release said cartridge ejector means from the cocked position.

2. A cartridge dispenser as set forth in claim 1 wherein;

said trigger means includes a trip rod and sear mechanism;

said trip rod being connected to said motive means by a cam follower;

said sear engaging said cartrdige ejector means such that when the trip rod is accuated by the cam follower the sear releases the cartridge ejector means.

3. A cartridge dispenser as set forth in claim 1 and further including;

a magazine track carried by said base member;

a magazine adapted to be mounted on said magazine track;

cartridges carried by said magazine;

magazine detent means carried by said support means and operative to maintain said magazine in a momentarily fixed position with respect to the magazine track; and magazine advance dog means carried by said support and operatively connected to said motive means so that the magazine is periodically advanced under control of the motive means.

4. A cartridge dispenser as set forth in claim 3 wherein;

said barrel means has a cut away portion in one side thereof in communication with said magazine;

said magazine and said cartridge ejector means interacting such that when said cartridge ejector means is released by said sear means the cartridge ejector means strips a cartridge from the magazine and expells it from the barrel.

5. A cartridge dispenser as set forth in claim 4 and further including;

ejector spring means operatively connected between said support means and said cartridge ejector means such that when said cartridge ejector means is released from the cocked position it is spring loaded to an eject position by said ejector spring means.

6. A cartridge dispenser as set forth in claim 1 and further including;

ejector spring means operatively connected between said support means and said cartridge ejector means such that when said cartridge ejector means is released from the cocked position it is spring loaded to an eject position by said ejector spring means.

7. A cartridge dispenser as set forth in claim 4 and further including;

igniting means mounted with respect to said barrel means such that as said cartridge is expelled from said barrel means the cartridge contacts said ignition means.

8. A cartridge dispenser as set forth in claim 7 wherein;

a firing pin; and wherein said dispenser further includes;

spring mounting means mounting said firing pin to said barrel means such that as a cartridge is expelled from said barrel means the cartridge contracts said firing pin.

9. A weather modification cartridge dispenser comprising;

supporting means for supporting the dispenser;

motive means affixed to said supporting means for supplying motive power to said dispenser;

cylinder-like means secured to said supporting means;

piston-like means slideably mounted within said cylinder-like means and adapted to reciprocate therein;

barrel-like means carried by said supporting means;

cartridge ejector means slideably mounted within said barrel means and reciprocable therein between a cocked position and an eject position;

cocking means carried by said piston-like member and engageable with a portion of said cartridge ejection means;

connecting-rod means linking said motive means and said piston-like member;

said motive means being operable to move said cartridge ejector means to the cocked position; and trigger means operably connected to said motive means to release said cartridge ejector means from the cocked position.

10. A weather modification cartridge dispenser as set forth in claim 9 and further including;

ejector spring means operatively connected between said supporting means and said cartridge ejector means such that when said cartridge ejector means is released from the cocked position it is spring loaded to the eject position by said ejector spring means.

11. A weather modification cartridge dispenser as set forth in claim 10 and further including;

shock absorber means in close physical proximity to said cartridge ejector means to cushion said cartridge ejector means as it reaches the limit of travel in the eject position.

12. A weather modification cartridge dispenser as set forth in claim 9 and further including;

a magazine track carried by said supporting means;

a magazine adapted to be mounted on said magazine track;

cartridges carried by said magazine;

magazine detent means affixed to said supporting means and operative to maintain said magazine in a temporarily fixed position with repect to the magazine track; and magazine advance means operatively connected to said motive means so that the magazine is periodically advanced under control of the motive means.

* * * * *